United States Patent

[11] 3,613,082

[72] Inventor Richard J. Bouchard
Amherst, N.H.
[21] Appl. No. 837,576
[22] Filed June 30, 1969
[45] Patented Oct. 12, 1971
[73] Assignee Sanders Associates, Inc.
Nashua, N.H.

[54] LOGIC EVALUATOR AND ADAPTIVE RECOGNITION NETWORK
18 Claims, 3 Drawing Figs.

[52] U.S. Cl. .......... 340/146.3 H, 340/146.2, 340/172.5
[51] Int. Cl. .......... G06k 9/12
[50] Field of Search .......... 340/172.5, 146.2, 146.3, 147; 235/92 (54), 92 (52), 92 (10)

[56] References Cited
UNITED STATES PATENTS

| | | | |
|---|---|---|---|
| 3,230,514 | 1/1966 | Kliman | 340/172.5 |
| 3,308,238 | 3/1967 | Brothman et al. | 340/147 X |
| 3,333,248 | 7/1967 | Greenberg et al. | 340/146.3 X |
| 3,412,255 | 11/1968 | Krieger | 340/146.3 X |
| 3,492,646 | 1/1970 | Bene et al. | 340/146.3 |

*Primary Examiner*—Maynard R. Wilbur
*Assistant Examiner*—Leo H. Boudreau
*Attorney*—Louis Etlinger

ABSTRACT: A pattern recognition system employs an addressable memory which stores response data concerning patterns. Each input pattern is presented to the system as a binary number and each such number addresses the memory so that response data is read out of the correspondingly numbered memory address. If the data read out of the memory in response to a particular input pattern is not correct, the data in the memory is changed so that the next time that particular pattern is presented to the system, the correct response data is read out of the memory.

Binary numbers corresponding to variants to an input pattern can be shifted around in an input register until they correspond to the input pattern number so that the system will respond to these variants as though they were the original input pattern.

An adjustable threshold control enables an input pattern to address the memory so that the desired response data is read out of the memory even though there is a discrepancy between the input pattern number and the memory address containing that data. This provides noise immunity as well as further generalization capability.

The invention herein described was made in the course of or under a contract or subcontract thereunder with the Department of the Navy.

FIG. I

INVENTOR.
RICHARD J. BOUCHARD
BY
ATTORNEY

INVENTOR.
RICHARD J. BOUCHARD
BY
ATTORNEY

LOGIC EVALUATOR AND ADAPTIVE RECOGNITION NETWORK

BACKGROUND OF THE INVENTION

This invention relates to a system for performing logic and pattern recognition tasks. It relates more particularly to a recognition system of the type which can be trained and retrained readily to adapt it to new and changing situations.

Trainable logic systems have been developed heretofore to perform various pattern recognition and logic tasks. However, these prior systems require a relatively large number of switches and other components; they cannot handle even a moderate number of input variables without becoming excessively large and requiring an excessive amount of hardware.

Prior recognition systems are further disadvantaged in that they are rather difficult to "train." Moreover, even when they are fully trained, they are unable, without undue complication, to recognize input patterns which, due to noise or other factors, are somewhat distorted. Also, conventional systems of which we are aware are unable to generalize so that they can recognize and catalog patterns similar to the ones specifically "taught" to them. These similar patterns may be, for example, the inverted or rotated versions of the original patterns.

SUMMARY OF THE INVENTION

Accordingly, this invention aims to provide an improved pattern recognition system which can be adapted to perform a variety of different logic and pattern recognition tasks.

Another object of the invention is to provide a system capable of being taught to recognize and classify each of a large number of distinct patterns.

A further object of the invention is to provide a pattern recognition system which has the ability to recognize patterns taught to it even if they are corrupted by a certain amount of noise.

Still another object of the invention is to provide a pattern recognition system which has the ability to generalize and thereby recognize patterns similar to the ones specifically taught to it.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

In general, the present system both recognizes and classifies patterns presented to it. These patterns may be visual ones such as characters or they may represent the simultaneous occurrences of certain events or the presence of certain parameter values.

Each input pattern is represented as a binary number which is stored in an input register. Each of these numbers corresponds to the address of a recirculating addressable memory. The contents of each memory address, in turn, includes the binary word reflecting the proper response for the corresponding input pattern. For example, assume that it is desired to classify a number of combinations of radar parameters into four "threat" categories. Each parameter combination, represented as a binary number, corresponds to an address in the memory which contains the "threat" category for that parameter combination.

A comparator compares the number in the input register with each successive address of the memory. If a match occurs, the contents of that address are read out of the memory. In the example, the output from the memory is the threat category of the input parameters. This may be processed further by other equipment or used by the operator directly, as the case may be.

The present system is "taught" by presenting training patterns to it and then "punishing" it when it yields an incorrect response or classification. In other words, each training pattern addresses the memory and if the data read out of that memory address is not the correct response for that input pattern, then the data at that memory location is corrected so that the next time the same pattern is presented to the system, the response will be correct.

This teaching process is carried out for a large number of training patterns. Whenever the system response to a particular pattern is not the desired one, a "punish" control is actuated to appropriately change the binary word at that memory address to correspond with the desired response. Ultimately, then, the system is able to recognize all of the training patterns which it has been taught and to correctly classify them. Thus, the system can be easily trained and retrained to perform a wide variety of logic and pattern recognition tasks.

The present system also has the ability to generalize. That is, it can be made to recognize patterns for which it was not specifically trained, but which have similar properties to those for which it was trained. This is accomplished by shifting the input pattern contained in the input register and then looking for a match between each number created and a memory address number.

Two distinct modes of generalization exist. In the first mode, the system is taught training patterns while in the "normal" state so that the proper response for each of the training patterns is contained at the corresponding memory address, as described above. Then the system is set to respond while in the "generalize" state. Now, when an input pattern is presented to the system for recognition, it is loaded into the input register and then periodically shifted end around bit-by-bit within the register until it completes a full shift cycle. Each new binary number created by each 1-bit shift of the register contents remains in the register for one complete cycle of the memory. If correspondence occurs between any of this series of numbers created in the input register and a memory address number, then the system responds by reading out the contents of that memory location.

It is important to understand at this point that the system will now respond not only to the original training pattern, but also to patterns which are variants of that training pattern. This is because the successive shifts of the binary number in the input register correspond to variations of the input pattern. For example, if the system is taught specifically to recognize and classify the letter "L," then when set to respond in the "generalize" state, it will also recognize and classify an upside-down "L." That is, if the binary number representing an upside-down "L" is shifted around in the input register, it will ultimately be the same as the number representing "L," whereupon the contents of the memory address corresponding to this number will be read out to yield the desired classification for the letter "L." If the system is now reset to the "normal" state, it will again only recognize those patterns which were specifically taught to it, i.e. the letter "L" in its normal position.

Thus, after being trained while in the "normal" state, the system response can be made to be either selective or general. Further, in this mode, if the system's response to a training pattern is changed or corrected, the correction will also apply to the variants of that training pattern. In other words, it would no longer recognize the upside-down "L" if the correction eliminated a normal "L" from the repertoire of recognizable patterns.

In the other generalization mode, the system is trained on a set of patterns while it is in a "generalize" state. In this case, the system is permanently taught all of the training patterns presented to it, as well as the variants of each such pattern which can be accomplished by end around shifts in the input register of the binary number corresponding to each training pattern.

More particularly, when a binary number representing a training pattern to be taught to the system is loaded into the input register, the contents of the memory location corresponding to that number are read out in the manner described above. If the response is not the desired one, then the operator actuates the "punish" control to correct the contents of that memory address to reflect the desired response. Following this, the number in the input register is shifted around one bit and, by using the "punish" control, the desired response data for the new number thus created is impressed at the correspondingly numbered memory address.

This same process is repeated following each 1-bit shift of the number contained in the input register so that several memory addresses contain response or classification data for variants of the single training pattern. It should be appreciated that the response or classification data may be the same at all of the addresses for these variants so that, in effect, the system will recognize and respond to all of the variants just as though they were the training pattern which it was specifically taught. Thus, in this mode, after being trained generally, the system will respond to the training patterns plus patterns similar to the training patterns, whether it is in a "normal" or a "generalize" state. Moreover, if left in the "generalize" state, the system will also recognize generalizations of the original generalizations.

Now, however, specific undesired responses can be "-punished" out of the system. More particularly, it may be desired to make the system nonresponsive to a selected one of a number of training pattern variants, or to classify that selected variant differently from the remaining ones. This is accomplished by setting the system to respond in the "normal" state when the binary number corresponding to the selected variant is contained in the input register and then actuating the "punish" control to correct the data contained at the correspondingly numbered memory location to reflect the desired classification or response.

It is important to note at this point the distinction between the generalization modes. In the first mode, the system is taught only the specific training patterns. It will then respond to variants of these training patterns by means of the "generalize" control. However, specific undesired responses cannot be "punished" out. In the second generalization mode, the system is taught both the patterns and their variants by training it in the "generalize" state. Then any specific undesired responses can be eliminated by retraining or "punishing" the system while it is in the "normal" state.

In order to increase the flexibility of the system, it includes an adjustable threshold control so that it will still recognize an input pattern (binary number) presented to it even though the pattern is altered or distorted by a certain amount of noise as broadly defined. In other words, the comparator will register a match between a pattern (binary number) in the input register and a memory address, even though there is a mismatch between some of the bits in the two numbers. Thus, the system will respond to and classify a pattern in the input register, even though selected bits of that pattern number differ from the corresponding bits of the training pattern number specifically taught to the system.

This feature makes the system extremely versatile. For example, it can be trained to recognize a pattern on a noise immunity setting of zero bits, i.e. no noise. Now, if the threshold control is switched to 2-bits noise immunity, the system will recognize the original training pattern taught to it plus all those which differ from this up to the extent of two bits.

As a further example, assume that the threshold control is set for a noise immunity of two bits. Now, if the system is trained to recognize an input pattern, it will simultaneously be taught to recognize all other patterns which vary from the original pattern by no more than two bits. If the threshold control is now adjusted to a noise immunity setting of zero bits, the system will recognize the patterns specifically taught to it, i.e. the original training patterns plus all those differing by no more than two bits from those training patterns.

The distinction between the first and second examples is that in the former, the system, after training, may be made to respond only to the original training patterns taught or to those patterns plus other patterns which differ by no more than a specified number of bits from those patterns. In the latter example, on the other hand, the system can be permanently taught a whole class of patterns which vary by no more than a specified number of bits from the training patterns. Thus, any undesired responses in the class of patterns taught may be selectively retrained out of the system by setting the threshold control back to a 0-bit noise immunity setting, and then activating the "punish" control when the response to certain patterns in the class are not the desired ones.

It should be noted that in the second illustration of noise acceptance, if the system is trained to recognize A TRAINING PATTERN ON A NOISE IMMUNITY SETTING OF two bits, and this setting is left at two bits, the system will then recognize all the patterns which vary by no more than two bits from this training pattern. Since it was taught all patterns differing by no more than two bits from this training pattern, the system will now respond to all patterns which vary by no more than four bits from the same training pattern.

It should be appreciated that this capability may also be considered as another means of enabling the system to generalize.

The ability of the system to function in "normal" and "-generalize" modes, as well as its ability to recognize patterns taught to it even though they are somewhat distorted by noise, makes it a powerful and versatile pattern recognition tool.

BRIEF DESCRIPTION OF THE DRAWINGS

For a fuller understanding of the nature and objects of the invention, reference should be had to the following detailed description taken in connection with the accompanying drawings, in which:

FIG. 2 is a pictorial representation of typical patterns which the FIG. 1 system can be taught and made to respond to.

DESCRIPTION OF THE PREFERRED EMBODIMENT

Figure 1:
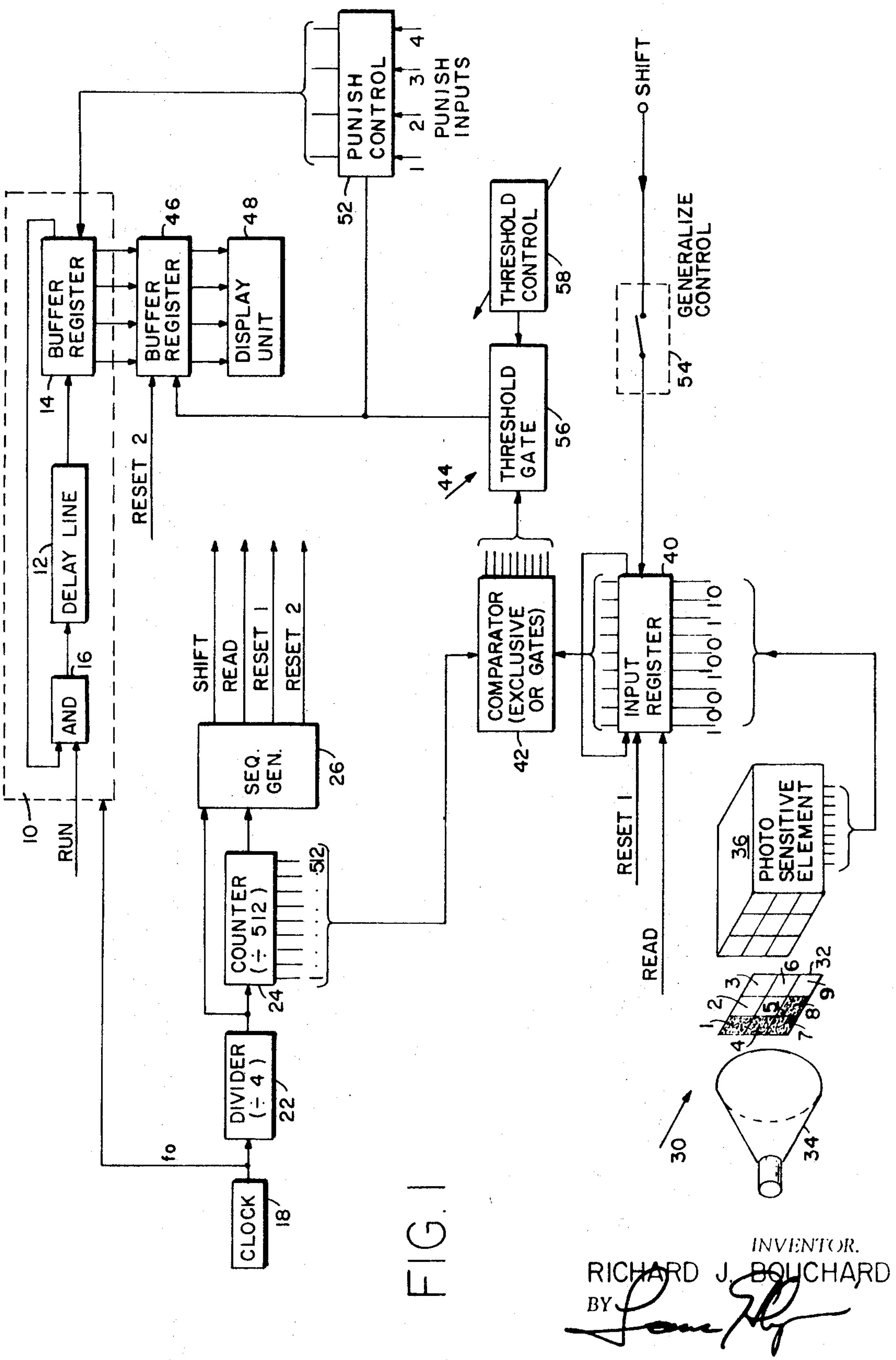
FIG. 1 is a block diagram of a pattern recognition system embodying the principles of this invention.

Referring now to FIG. 1 of the drawings, the present recognition system comprises an addressable recirculating memory indicated generally at 10. While any conventional serial or parallel memory configuration may be used, the illustrated memory 10 is composed of a delay line 12, a buffer shift register 14 and an AND circuit 16 connected in a closed loop. Data is recirculated from register 14 to delay line 12 by way of AND circuit 16, which is normally enabled. Circuit 16 may be disabled by interrupting a RUN signal when it is desired to erase the contents of memory 10.

In the illustrated system, memory 10 has 512 addresses or locations designated in order by the numbers 1 to 512, and each address has a capacity of four bits. Thus, memory 10 is able to classify up to 512 patterns and to store a 4-bit classification word for each such pattern.

The memory shifts individual bits in response to the output of a clock 18 having the frequency $f_0$. The clock 18 pulses are also applied by way of a divide-by-four divider 22 to a counter 24. Counter 24 is capable of counting from one to 512 and it is indexed at the rate $f_0/4$ so that the contents of counter 24 corresponds to the address of the word contained in buffer register 14. For example, when counter 24 contains the number "95," the word at address 95 of memory 10 is contained in register 14. When the number "33" is contained in counter 24, the word at memory address 33 is contained in register 14. In this sense, then, counter 24 functions as an address register for memory 10.

The outputs of divider 22 and counter 24 are also applied to a sequence generator 26. Generator 26 develops four sets of timing signals which control the operation of various elements of the system to be described later. These signals are identified as follows: SHIFT pulses, READ pulses, RESET 1 pulses and RESET 2 pulses.

The system receives training data by way of an input section indicated generally at 30 which converts the data to a digital format. Since the illustrated system is designated specifically to recognize and classify input patterns such as characters, section 30 may comprise any one of a number of well-known devices for converting an image to a binary number. Illustratively, the pattern is carried by a transparency 32. The transparency is conveniently divided into nine rectangular areas which are conceptually numbered 1 to 9. Selected ones of these numbered areas are made opaque to form the particular pattern. In the figure, the pattern is the letter "L" which occupies areas 1, 4, 7, and 8 of transparency 32.

A cathode-ray tube 34 illuminates successive areas in transparency 32 and a photosensitive element 36 positioned on the opposite side of transparency 32 senses light from tube 34. Element 36 actually comprises nine separate photocells which are in register with the nine numbered areas of transparency 32. When tube 34 illuminates the transparency, those photocells in element 36 which are opposite transparent areas of the transparency 32 receives light and emit an output signal. On the other hand those which are opposite the opaque areas of the transparency receive no incident light and therefore produce no output.

Thus, a binary ONE appears on those lines associated with photocells which receive no incident light, while a ZERO appears on those lines associated with photocells which receive light from tube 34. Consequently, the 9-bit binary number appearing on the output lines of element 36 (i.e. 100100110) corresponds to the character carried by transparency 32 (i.e. "L"). It will be appreciated that binary numbers can be derived in this way for most characters.

This number is loaded into a 9-bit input register 40 in response to a READ pulse applied to register 40 by sequence generator 26. This READ pulse is generated every ninth cycle of memory 10. That is, its rate is $f_0/4608$ in the example. A RESET 1 pulse from generator 26 signals when each new number is contained in the register and each number remains in register 40 until a new pattern is presented to the system.

A comparator 42 then compares the number in input register 40 with the contents of counter 24 as the latter cycles through its count. When the comparator detects a match between these two numbers, it causes a threshold section indicated generally at 44 to emit a pulse to a buffer register 46. This pulse reads out the contents of the correspondingly numbered memory address, which is then in buffer register 14, into buffer register 46. Also, a RESET 2 pulse from generator 42 signals when each new number is contained in register 46. The contents of register 46, in turn, control a display unit 48 which displays the classification or response for the particular pattern being examined in input section 30.

Each memory 10 location contains a 4-bit word. Consequently, the illustrated system is able to classify input patterns into four different independent categories, or 16 dependent categories (i.e., training the system to perform four independent logic functions of 9 variables, or to classify 9-bit patterns into 16 different categories, respectively). For purposes of illustration, we will assume that each word contained in memory 10 represents four independent classification categories or groups. That is, a "1" in each of the four positions in register 14 indicates a different group. For example, 1000 in register 14 indicates a Group 1 letter; 0100 indicates Group 2, and so forth. However, 0000 indicates no group at all.

Table I below divides the various letters of the alphabet into four groups.

TABLE I

| | |
|---|---|
| Group 1 | E F H I L M N T |
| Group 2 | A K V W X Y Z |
| Group 3 | B D O P Q R |
| Group 4 | C G J S U |

Group I is comprised of letters made up solely of vertical and horizontal line segments. Group 2 consists of letters having oblique segments; Group 3 is comprised of letters formed with closed loops and Group 4 is made up of those letters having curved segments which do not form closed loops.

When training the system, a letter (e.g. "L" is placed in input section 30. If display unit 48 does not show the proper classification for that letter (i.e. Group 1), the operator actuates a punish control 52. Punish control 52 comprises four independently operated button switches 1–4. When each button is depressed, the classify from threshold section 44 is routed to buffer register 14 so as to complement the content of the associated register stage. That is, if the stage contains a "1" the "1" is changed to a "0," and vice versa.

Thus, each time unit 48 shows an incorrect response, the operator depresses one or more punish buttons 1–4. Then, after another complete circulation of memory 10, i.e. when comparator 42 again detects correspondence between the number in counter 24 and the number in register 40, the output pulse from threshold section 44 is applied to the appropriate register 14 stages so that the register contents are corrected. Now, the next time memory 10 recycles, the corrected contents of register 14 are loaded into register 46 so that unit 48 now displays the proper classification for the input pattern being examined in input section 30.

To illustrate, assume that for the letter L (which is a Group 1 letter), unit 48 incorrectly displays a Group 3 classification. This means that the content of the memory address corresponding to the letter L is 0010 instead of 1000. Upon seeing this incorrect response, the operator depresses punish control 52 buttons 1 and 3 so that when the word at the same memory address is again contained in register 14, the pulse from section 44 is routed to the first and third register 14 stages so that the first and third bits of the classification word are complemented. Thus, on the next memory 10 cycle, the word loaded into register 46 is 1000, causing unit 48 to correctly display Group 1.

The same training procedure is followed with all of the above letters of the alphabet, so that there is a memory 10 address corresponding to each letter of the alphabet and each address contains the proper group classification for the associated letter. Once the system is trained in this way, it will recognize and properly classify all of these letters when they are again presented to it.

Still referring to FIG. 1, the present system actually has the capacity to generalize. That is, it can be trained to recognize characters which are similar to the above 26 letters on which the system was specifically trained in the manner described above.

More particularly, input register 40 is a recirculating register and its contents can be shifted and around bit-by-bit to create a series of nine binary numbers, each of which can be compared with the contents of counter 24 in the manner described above. Register 40 is shifted by SHIFT pulses from sequence generator 26 applied to the register by way of a generalize control switch 54. SHIFT pulses occur at the beginning of each cycle of memory 10.

Thus, in the example of the letter L, when switch 54 is closed, the first SHIFT pulse, which occurs at the beginning of the next cycle of the memory 10, shifts the number contained in register 40 (i.e. 100100110) one bit to the left so that it now reads 001001101. The next shift pulse, which occurs at the beginning of the following cycle of memory 10, again shifts the register 40 contents one more bit to the left so that it now reads 010011010, and so on. Thus, after nine circulations of memory 10, corresponding to one complete shift cycle of register 40, the original number is again contained in the register.

Figure 2:
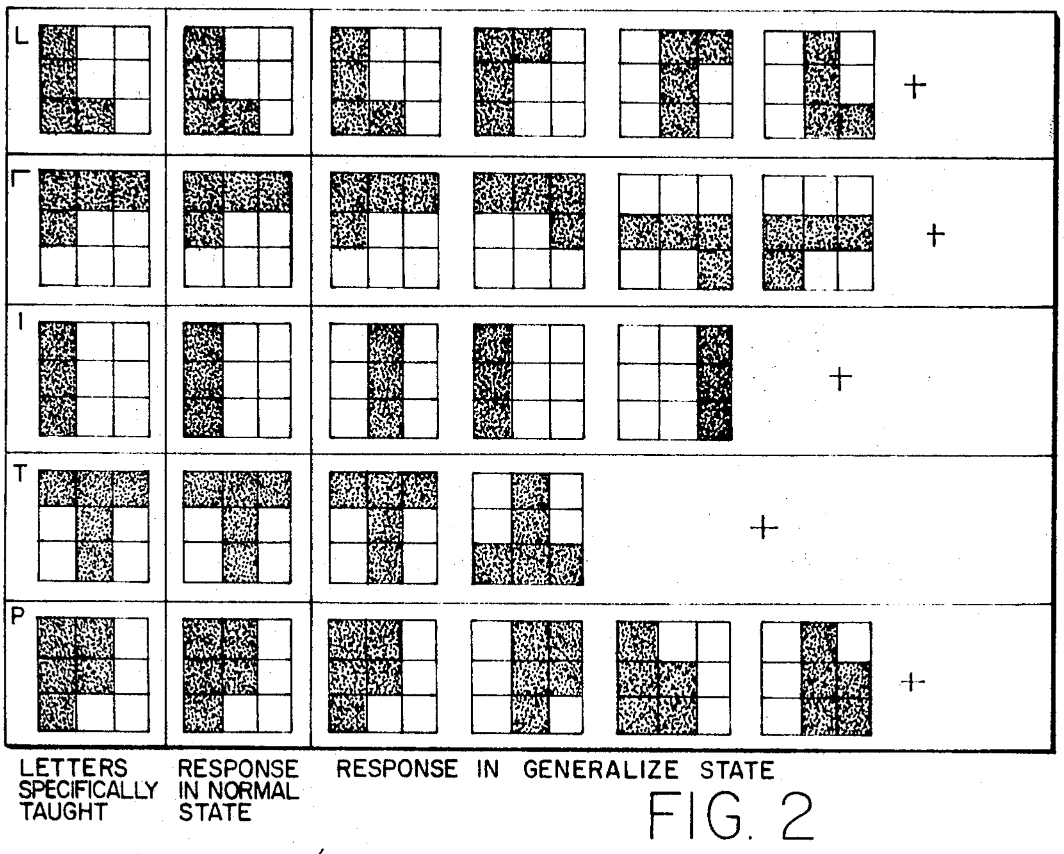

It turns out that many of the new numbers created by this end around shifting of the register 40 contents correspond to translations, rotations, or other variants of the original training pattern (see FIG. 2). This means that if the system is taught a training pattern and if a certain variant thereof is presented to the system while it is in its generalize state, then the input number contained in the register 40 can be shifted until it corresponds to the training pattern number, whereupon comparator 42 will detect a match and display unit 48 will classify the variant as though it were the original pattern.

To illustrate, assume that transparency 32 carries an upside-down letter L. In this event, the corresponding number contained in register 40 is 110100100 (see FIG. 2). Since the system has not specifically been taught this character, the contents of the correspondingly numbered memory 10 address is 0000 and the character elicits no response from display unit 48. However, if this input number (corresponding to the upside-down L) in register 40 is shifted six bits to the left, it becomes the same as the L number shown in FIG. 1. Thus, after six SHIFT pulses corresponding to six circulations of memory 10, comparator 42 detects a match between the number in input register 40 and the same number in counter 24. Whereupon the contents of the correspondingly numbered memory address reflecting the proper classification of the letter L is loaded into buffer register 46, causing display unit 48 to display Group I (see Table 1).

As seen from FIG. 2, an upside-down L shifted one space to the right would also be recognized by the system, as would an upright L shifted one space to the right. This is because these two variants of the letter L can be represented by binary numbers which are shifted left five bits and eight bits, respectively, from the letter L number shown in FIG. 1.

It will be seen from FIG. 2 that not all orientations of a given letter can be derived by means of end-around shifting of the binary number corresponding to that letter. Consequently, when the system is taught to recognize only the letter L, for example, it will not respond to an L lying on its side (i.e. ┌─). To overcome this limitation, the system can, of course, be specifically trained to respond to "┌─" in the manner described above. In this event, when generalize control switch 54 is closed, the system will recognize this trained character as well as all of its variations which can be accomplished by end-around shifting in register 40 of the "┌─" number. In FIG. 2, we have indicated this additional series of variants which the system will respond to in the generalize state when taught specifically to recognize "┌─".

Thus, if one wishes the system to classify a variant of a letter which cannot be obtained by end-around shifting of the number corresponding to that letter or another variant thereof, the system can be taught specifically to recognize each variant, instead of relying on the systems generalizing capability. For example, as seen from FIG. 2, the number for the letter T can be translated in the above fashion to form the number for only one variant of T (i.e. an upside-down T). Therefore, even when the system is operating in its generalize state, it will not respond to a T lying on its side. Consequently, if one desires the system classify other T variants, they must be specifically taught to the system as described above so that the proper response data for each T variant is stored in memory 10. When this is done, the system will respond to each T variant in both its normal and generalize states.

It should also be apparent that the system will recognize other variants of an input pattern if the input number in register 40 is shifted about in other ways. For example, the register can be divided into three groups of three stages and the contents of each group shifted end-around independently.

Referring again to FIG. 1, in the above discussion we have assumed that the system was in its normal state when it was taught the letters of the alphabet. Thus, only 26 memory 10 addresses contain response information. However, as we have seen, by having the system respond while in its generalize state, it will also recognize and classify certain variants of those letters because the variant-identifying numbers can be shifted around until they coincide with one of those 26 address numbers.

The system can also be taught while it is in its generalize state. More particularly, when training the system to recognize a letter (e.g. L), the binary number in register 40 corresponding to the letter can be shifted end-around as described above by closing generalize control switch 54. This creates a series of nine numbers representing variations of the input letter. Classification data for each of these numbers is then impressed into memory 10 at the correspondingly numbered address using punish control 52 as described above.

Thus, a single input pattern or letter may develop classification data in up to nine memory 10 addresses corresponding to nine variants. If the data in any of these addresses is incorrect or undesired, the operator may correct it or erase it by opening switch 54 and specifically retraining the system on the corresponding variants using punish control 52.

To illustrate, if the system is taught the letter L while in the "generalize" state (i.e. switch 54 is closed), memory 10 will be addressed nine times corresponding to the nine possible positions in register 40, of the binary number representing the letter "L." Each time the memory is addressed, the contents of that address is loaded into register 46. In this example, we will assume again that the system is classifying only letters and variants thereof and that the proper response for all of these is a Group 1 display by unit 48.

If the data in register 46 causes unit 48 to give the proper response, then the word is automatically recirculated in memory 10. However, if the response is incorrect, then the operator pushes the appropriate punish control 52 buttons to correct the data at that memory address.

As seen from FIG. 2, only three recognizable variants of the letter L can be developed by end-around shifting of the binary number representing L. This means that of the nine memory locations which are addressed due to the input letter L, only four are relevant. The operator can retrain the system specifically to respond only to the four relevant patterns by opening switch 54, presenting the four relevant patterns to the system, and depressing the appropriate punish control 52 buttons to impress a 1000 at those four addresses of memory 10 and, using the same procedure with the five nonrelevant patterns, impressing 0000 at the other five addresses involved. Now, whenever L or any of these three recognizable variants is presented to the system, it will be recognized and given a Group 1 classification by display unit 48. The other five irrelevant patterns based on L will elicit no response.

If subsequently the operator wishes to change the classifications of the letter L, but not that of its variants, he can switch the system to its normal state (i.e. switch 54 is open), put L in input section 30 and change the data at the memory 10 address corresponding to L by means of punish control 52.

It is important to note at this point the distinction between the operation of the system when it is trained in its normal state and its operation when trained in the generalize state. In the former, there is no response word in memory 10 for each training pattern taught to the system. However, if the generalize control switch 54 is closed, the system will respond to up to eight variants of the training pattern as though they were the original training pattern. In this case, specific undesired responses cannot be "punished" out of the system since there is only one response word in memory 10. Therefore, the response for one of the variants cannot be changed without changing the response for the original pattern, plus all variants thereof.

On the other hand, when the system is trained in the generalize state using control switch 54, there will be up to nine response words in memory 10 for each training pattern presented to the system. The response words at all of these addresses may be the same, in which case, the system will give the same response for the original pattern plus its eight variants, just as it does when it operates in its normal state. Now, however, specific undesired responses for some of the nine patterns can be changed by retraining the system on these selected patterns while it is in its normal state (i.e. with switch 54 open), using punish control 52.

Referring again to FIG. 1, additional flexibility is given the present system by means of threshold section 44. Section 44 includes a threshold gate 56 and an adjustable control 58 therefor. By proper adjustment of control 58, the system can be made to respond to an input pattern, even though it is corrupted by a selected amount of noise and therefore is somewhat different from the training pattern specifically taught to the system. In other words, even though an input pattern number in register 40 may not exactly match any count in counter 24, (or at least not the correct count) the output of comparator 42 will still cause threshold section 44 to emit an output pulse to register 46. Consequently, display unit 48 may still classify the input pattern as though it was the one specifically taught to the system.

For example, assume that the system is specifically trained to recognize the letter L as described below. The means that memory 10 address 100100110 contains the proper classification word for that letter (i.e. 1000). Now assume that a character is presented to the system for recognition. This character is the same as the letter L, except that there is a small gap in the short leg of the letter, i.e. area 9 of transparency 32 (FIG. 1) is opaque instead of area 8. This distorted letter will be sensed as the binary number 100100101. A comparison of this number with the correct number for the letter L shows that there is a discrepancy between the eighth and ninth bits of the two numbers. Consequently, the system would ordinarily not display the proper classification for this distorted letter L because the incorrect number in register 40 would not properly address memory 10. However, as we shall see, threshold section 44 can be set for 2-bits noise immunity so that the system will respond properly even though the input number has these two incorrect bits.

Figure 3:
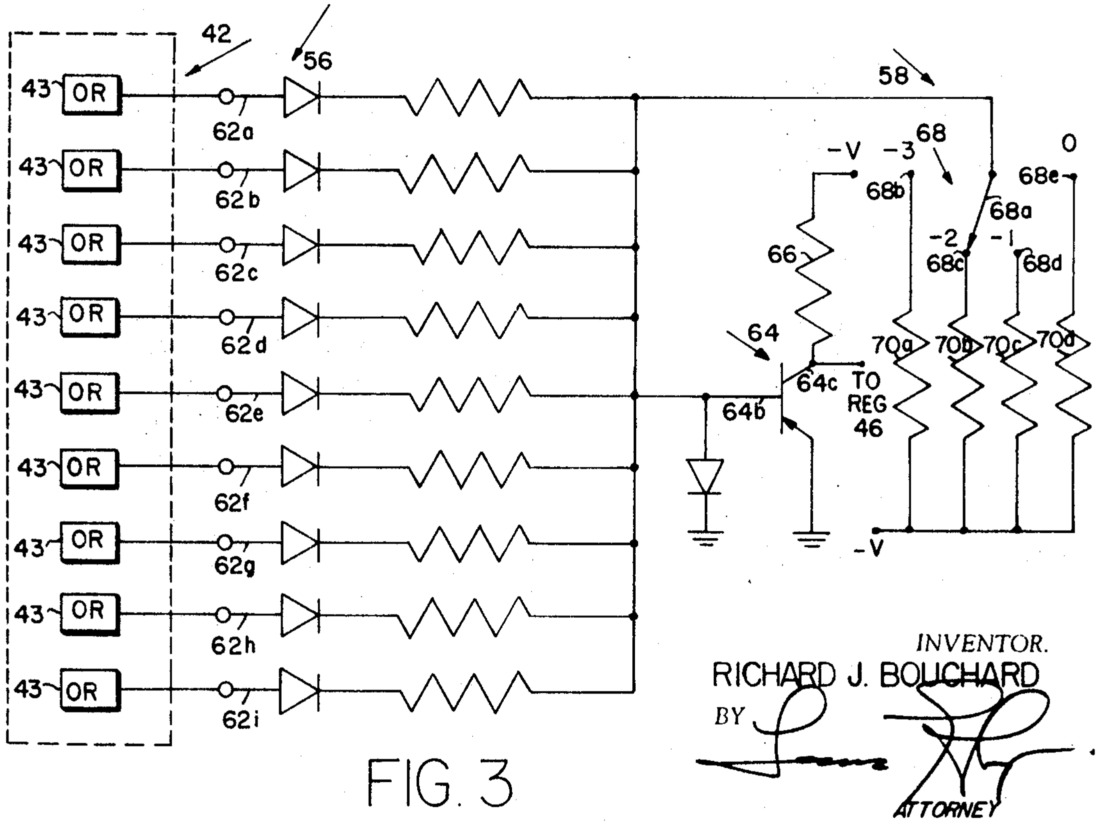
FIG. 3 is a schematic diagram of a portion of the FIG. 1 system.

Referring now to FIG. 1 and also to FIG. 3, which shows section 44 in greater detail, when a 9-bit number is contained in register 40, its nine bits are applied to nine EXCLUSIVE OR gates 43 in comparator 42, along with the nine bits in the number from counter 24. Each EXCLUSIVE OR gate 43 produces an output when the two input bits applied to it are different. Otherwise, it produces no output. The outputs from the EXCLUSIVE OR gates 43 are applied respectively to the nine input lines **62*a*–62*i* of gate 56. Each input line comprises a diode and a resistor in series. The output ends of the lines are all connected to the base 64*b* of a grounded-emitter transistor 64. The transistor collector 64*c* is, in turn, connected by way of a load resistor 66 to a source of negative voltage. The output from section 42 to register 46 and to punish control 52 is taken from collector 64*c*. Threshold control 58 comprises a four-position switch 68 whose arm 68*a* is connected to the transistor base 64*b*. The four tapes 68*b*–68*e* of switch 68 are connected by way of suitably weighted resistors 70*a*–70*d* to a source of negative voltage. Thus, control 58 and lines 62*a*–62*i* form a summing network, with the former applying a negative voltage and the latter a positive voltage to transistor base 64*b***.

The switch 68 in threshold control section 58 is adjustable to switching one of the resistors **70*a*–70*d* which add different selected negative biasing voltages at the transistor base 64*b*. We will designate these four settings –3 bits, –2 bits, –1 bits and 0 bits of noise immunity. When switch 68 is set to the 0 position (i.e. contacting tap 68*e*), an output from any OR circuit 43 cuts off transistors 64. That is, the voltage from a single OR circuit 43 added to base 64*b* is greater than the voltage from resistor 70*d*. On the other hand, when switch 68 is set at –3 bits, transistor 64 is cut off if any four or more OR circuits 43 have outputs. In other words, the voltage sum of four OR circuits 43 added to base 64*b* is greater than the voltage from resistor 70*a*. But, if there are outputs from only three or fewer of the OR circuits, the voltage sum is not enough to offset the voltage from resistor 70*a* so that transistor 64 will conduct and section 44 will emit an output signal indicating correspondence between 6 or more bits of the numbers being compared by comparator 42. In other words, since the outputs of the EXCLUSIVE OR circuits in comparator 42 are active when their input bits do NOT correspond, then three or fewer active outputs from comparator 42** means that six or more of the bits being compared coincide.

Thus, with a threshold control setting of –3 bits, gate 56 emits a pulse for all counts of counter 24 which have six or more bits (out of nine) which are the same as the corresponding bits of the input pattern number in register 40. Likewise, a threshold control 58 setting of –2 bits requires correspondence between seven out of nine of the bits in the two numbers being compared by comparator 42; a setting of –1 bits requires correspondence between eight out of nine of those bits and, as we have seen, a threshold control setting of 0 bits requires complete correspondence between the two numbers.

Thus, in the example given above of a distorted L having a 2-bit error, if control 58 is set at –2 bits, then the system will respond to that pattern as though it were the letter L. On the other hand, with a threshold 58 setting of –1 or 0 bits, the distorted letter will not elicit the L response from the system.

Of course, the system could be arranged so that comparator 42 emits signals when it detects a match between the contents of the corresponding register and counter stages. In this event, section 56 would sum voltages from six to nine of the outputs from the comparator. However, we prefer to use inhibitory inputs from comparator 42 and a threshold range of –3 to 0 bits because the latter allows a broader "gap" between threshold settings than does the former, i.e. the spacing between threshold settings is one part in four rather than one part in nine. In other words, transistor 64 can discriminate more readily between base-biasing voltages of 0, 1, 2 and 3 volts than it can between voltages of 6, 7, 8 and 9 volts.

It should be appreciated that when threshold control 58 has a setting other than zero bits, it is possible for the same input pattern to elicit more than one response from the system, even though the system is not operating in its generalize mode. For example, assume that the system is trained specifically to recognize letters of the alphabet. Assume also that control 58 has a setting of –2 bits. This means that the system will respond to the letter L and to all characters which vary by no more than two bits from the letter L as though they all were the letter L. In addition, since the letter L varies by only two bits from the letter I (see FIG. 2), the system will also respond to the L as though it were the letter I. Thus, the system produces a double output. In most situations, a correspondence between six or more bits of the numbers being compared by comparator 42 is enough to enable the system to properly classify a large number of input patterns into the four designated groups. Thus, in the previous illustration, the letters L and I are both in Group 1 (Table I) and are both so classified by the system set on –2 bits of noise immunity. On the other hand, reference to Table I shows that a discrepancy of several bits is required in order to confuse the letters in different classification groups. Therefore, the system can readily distinguish between letters in different groups even when set for maximum noise immunity.

It will be appreciated now that by proper operation of threshold control 58, a wide variety of noise immunity options are available from the system. For example, assume that the system is trained specifically (i.e. switch 54 open) with a threshold setting of zero bits to recognize a pattern. If the system is now switched to a threshold setting of –2 bits, it will recognize the original pattern taught, plus all those which vary from this by no more than 2 bits.

As a second example, assume that the system has a threshold setting of –2 bits and is again trained specifically to recognize an input pattern. In this even, it will simultaneously be taught to recognize all other patterns which vary from this training pattern by no more than 2 bits. Now, if the threshold control 58 is set to 0 bits, the system will respond to the patterns which it was taught, i.e. the original training patterns, plus all those which vary by no more than 2 bits from those patterns.

There is a definite distinction between the first and second examples. In the first, the system, after training, may be made to respond only to the specific patterns taught, or to these patterns plus all those which vary by no more than 2 bits from these patterns. Undesired responses cannot be punished out. In the second example, however, the system is permanently taught a whole class of patterns which vary by no more than 2 bits from the training patterns. Therefore, any undesired responses in the class of patterns taught may be selectively changed by setting threshold control 58 at 0 bits and appropriately operating punish control 52.

It should be noted also from example 2 that, after training the system on patterns with a threshold setting of −2 bits, if the setting is left at −2 bits during the recognition process, the system will recognize all patterns which vary by no more than 2 bits from those taught. Since it was taught all patterns differing by no more than 2 bits from the original training patterns, the system will respond to all patterns which vary by no more than 4 bits from the original training patterns. Note also that in this example, the system responds to more patterns than it is taught, even though there is no change in its control settings.

The following table summarizes the responses of the FIG. 1 system for the various settings of controls 52, 54 and 58:

TABLE II

| Mode | Threshold generalize Setting | Mode | Using "punish" control | System response |
|---|---|---|---|---|
| Response mode: | | | | |
| 1 | Zero bits | No | No | Will respond to those patterns it has been taught. |
| 2 | N bits [1] | No | No | Will respond to those patterns it has been taught plus all patterns which vary from these by no more than N bits. |
| 3 | Zero bits | Yes | No | Will respond to those patterns taught plus variants of these patterns taught. |
| 4 | N bits [1] | Yes | No | Will respond to those patterns taught plus variants of the patterns taught plus all patterns varying by no more than N bits from these. |
| Training mode: | | | | |
| 1 | Zero bits | No | Yes | Will be taught to recognize those training patterns presented to it. |
| 2 | N bits [1] | No | Yes | Will be taught to recognize those training patterns presented to it plus all patterns varying from these by no more than N bits. |
| 3 | Zero bits | Yes | Yes | Will be taught to recognize training patterns plus variants of these patterns. |
| 4 | N bits [1] | Yes | Yes | Will be taught to recognize training patterns plus variants of these patterns plus all patterns varying by no more than N bits from these. |

[1] N=1 to 3.

With relatively minor changes in its basic instrumentation, the present system can be modified to effectively handle problems involving a much larger number of variables. In the FIG. 1 system, there is enough memory storage capability to handle any possible permutation of the nine input variables. For a very large number of variables (15 or more), this starts to become impractical. At this point, however, rather than have memory capacity for all possible combinations of input variables as is done in the FIG. 1 system, only those combinations being used at any given time can be stored.

In other words, the numbers representing the desired input patterns can themselves be stored in the memory In this case, when an input pattern is presented to the system for recognition, the memory is searched to see if a number corresponding to the input pattern is stored there. If it is there, then the system responds. If it is not there, then it does not respond. In order to punish the system for an incorrect response, the memory is searched for the number corresponding to the input pattern. If the number is present, then it is erased from the memory. If it is absent, then it is entered into the memory. Thus, only active input numbers (input patterns) are kept in storage. Here, additional time savings may be gained because data can be read into the memory by searching for the first empty memory location rather than having an addressable memory and having to wait for the contents of the proper address to come into position to be changed.

Also, in this more elaborate system, tag bits can be used so that several output categories or classifications can be handled simultaneously. The response and punish modes can also be appropriately modified. For example, the input pattern number might be erasable from the memory only if its associated tag bits are 0. Similarly, the noise immunity and generalization capabilities can be included in this larger system. In addition, for a large number of variables, the comparator 42 might suitably be replaced with a serial comparator with a counter which keeps track of the number of coincident bits.

Also, it should be understood that the illustrated system can be used as a basic "building block" in a much larger system with the individual blocks being appropriately connected.

It will be appreciated from the foregoing, then, that my improved pattern recognition system is able to correctly recognize and classify a large number of input patterns having a relatively large number of variables. Further, the system can be trained and retrained relatively easily to handle changing input information. Moreover, through its generalizing and noise immunity (threshold) capability, the system is still able to recognize and properly classify input patterns even though they are corrupted by noise or are variants or translations of the patterns taught to the system.

Thus, the objects set forth above, among those made apparent from the preceding description are efficiently attained.

I claim:

1. A pattern recognition system comprising
A. an addressable memory for storing pattern response data,
B. means for presenting input patterns to the system each in a coded format,
C. means for addressing the memory in accordance with the coded format of the each said input pattern so that response data for each said input pattern can be read out of the memory,
D. means for shifting around the coded format of a variant of each said input pattern until the variant format substantially corresponds to an address in the memory so that the system responds to the variant as though it was said input pattern, and
E. means for correcting the response data stored in the memory when the data read out of the memory in response to each said input pattern is not the desired one so that when said input pattern is again presented to the system, the desired response data is read out of the memory.

2. A pattern recognition system comprising
A. an addressable recirculating memory for storing response data for input patterns,
B. an address register associated with the memory and for storing binary numbers representing locations in the memory,
C. an input register for storing a binary number representing an input pattern,
D. means for comparing the numbers in said address register and said input register, said comparing means emitting a recognition signal when the two numbers coincide,
E. an output register responsive to the signals from said comparing means for reading out response data from the correspondingly numbered memory address, and
F. a punish control associated with the memory for changing the contents of the correspondingly numbered memory address when the data read into the output register is incorrect, said punish control including switch means connected to receive each recognition signal from the comparing means and route said recognition signal to selected memory stages of the correspondingly numbered address so as to complement the contents of those stages whereby the correct response data is read out of that address upon the occurrence of the next recognition signal.

3. A pattern recognition system as defined in claim 2 and further including an adjustable threshold control responsive to the output of the comparing means, said threshold control emitting a recognition signal to the memory register and punish control, even though a selected number of corresponding bits of the numbers in said input register and address register do not coincide so that correct response data for a pattern is read into the output register, even though the input pattern actually presented to the system for recognition is distorted.

4. A pattern recognition system comprising

A. an addressable memory for storing response data concerning input patterns,

B. an input circulating shift register which stores an input pattern as a binary number for presenting each input pattern to the system in a coded format, C. means including a counter for addressing the memory in accordance with the number of each said input pattern so that response data for each said input pattern can be read out of the memory, D. means for correcting the response data stored in the memory when the data read out of the memory in response to each said input pattern number is not the desired data so that when the input pattern number is again presented to the system, the desired response data is read out of the memory, and E. means for shifting the input pattern number around in the input register so that numbers representing variants of each said input pattern can be translated into the number for that input pattern, whereby the system responds to the variants as though they were that input pattern.

5. A pattern system as defined in claim 4 and further including means for storing the desired response data for each of the variants in the memory so that when any of these variants is again presented to the system, the desired response data is read out of the memory.

6. A pattern recognition system comprising

A. an address register for storing binary numbers representing locations in a memory, B. an addressable recirculating memory, including a shift register associated with the address register and arranged to contain data at the address addressed by the address register, C. an input register for storing a binary number representing an input pattern, D. means for comparing the numbers in said address register and said input register, said comparing means emitting a recognition signal when the two numbers coincide, E. an output register responsive to the signals from said comparing means for reading out response data from the correspondingly numbered memory address, and F. a punish control associated with the memory for changing the contents of the correspondingly numbered memory address when the data read into the output register is incorrect, said punish control being arranged to route signals from the comparing means to selected stages of the memory register so that the content thereof is complemented the next time the two numbers coincide.

7. A pattern recognition system comprising

A. an addressable memory for storing pattern response data,

B. An input register for storing a binary number representing an input pattern,

C. means for addressing the memory in accordance with the number contained in the input register so that data at the memory address corresponding to that number is read out of the memory, D. output means responsive to the data read out of the memory, E. means for shifting an input pattern number around the input register so as to create a series of numbers representing variants of the input pattern, and F. said addressing means addressing the memory when a number in the series corresponds to a memory address so that the output means responds to selected input pattern variants.

8. A pattern recognition system as defined in claim 7 and further including means for changing the response data stored in the memory when the response of the output means to a particular input pattern or variant thereof is not the correct response so that when that input pattern or variant thereof is again presented to the system, the output means responds correctly.

9. A pattern recognition system as defined in claim 7 and further including an adjustable noise-immunity control which enables the addressing means to address a memory location whose address is different by a selected number of bits from an input pattern number.

10. A pattern recognition system as defined in claim 9 and further including means for changing the response data stored in the memory when the response of the output means to a particular input pattern or variant thereof is not the correct response so that when that input pattern or variant thereof is again presented to the system, the output means responds correctly.

11. A pattern recognition system comprising

A. an addressable recirculating memory for storing response data for input patterns, B. an address register associated with the memory and for storing binary numbers representing locations in the memory, C. an input register for storing a binary number representing an input pattern, D. means for comparing the numbers in said address register and said input register, said comparing means emitting a recognition signal when the two numbers coincide, E. an output register responsive to the signals from said comparing means for reading out response data from the correspondingly numbered memory address, F. a punish control associated with the memory for changing the contents of the correspondingly numbered memory address when the data read into the output register is incorrect, and G. further including means for shifting the binary number around in the input register so as to create a series of new numbers, said comparing means emitting a recognition signal to said output register whenever a number in the series coincides with the number in the address register so that the system is able to recognize a series of input pattern variants.

12. A pattern recognition system as defined in claim 11 wherein each number in the series created by shifting the contents of the input register addresses the memory so that response data for a series of input pattern variants can be stored in the memory.

13. A pattern recognition system for storing response data for input patterns comprising A. an addressable recirculating memory including a shift register, B. an output register connected to receive the contents of the memory register upon receiving command signals, C. display means arranged to respond to the contents of the output register, D. an input register for containing a binary number representing an input pattern, E. a counter arranged to cycle through a count corresponding to the number of addresses in the memory, each count in the counter denoting the address of the response data contained in the memory register at the time of the count, F. means for comparing the numbers contained in the input register and the counter, said comparing means emitting signals which indicate the degree of coincidence between the numbers contained in the input register and counter, G. a threshold control responsive to the output of the comparing means, said threshold control emitting a command signal to the output register upon receipt of signals from the comparing means indicating a selected degree of coincidence, and H. means for adjusting the threshold control so that the operator can vary the degree of coincidence required between the two numbers being compared before the comparing means emits a command signal, whereby the correct response data for a particular pattern is loaded into the output register and displayed by the display means, even though the input pattern being examined is a distortion of that particular pattern.

14. A pattern recognition system as defined in claim 13 and further including a punish control arranged to route command signals from the threshold control to selected stages of the memory register when the data displayed by the display means in response to a particular input pattern number in the input register is incorrect so as to change the data in the memory register so that the next time that particular input pattern number is contained in the input register, the desired response data will be loaded into the output register and displayed by the display means.

15. A pattern recognition system as defined in claim 14

A. wherein the input register is a circulating register, and

B. further including means for shifting an input pattern number around in the input register so as to create a series of binary numbers corresponding to variants of the input pattern.

16. A pattern recognition system as defined in claim 15 and further including means for storing in the memory response data for each pattern number in the series created by shifting the contents of the input register so that the next time input patterns corresponding to any of these numbers is presented to the system, the display means displays the correct response for that pattern.

17. A pattern recognition system as defined in claim 16

A. wherein the comparing means comprises a set of gates, each gate responding to the contents of corresponding stages of the input register and counter, and B. the threshold control comprises 1. a threshold gate,
2. an adjustable biasing means, and
3. means for summing the outputs of the gates and the biasing means so that correspondence between a selected number of bits in the numbers contained in the input register and counter cause the threshold gate to emit a command signal to the output register and punish control.

18. A pattern recognition system comprising

A. an addressable recirculating memory for storing response data for input patterns, B. an address register associated with the memory, and for storing binary numbers representing locations in the memory, C. an input register for storing a binary number representing an input pattern, D. means for comparing the numbers in said address register and said input register, said comparing means including a series of gates, each being connected to respond to the content of corresponding different stages of the input and address registers and said comparing means emitting a recognition signal when the two numbers coincide, E. an output register responsive to the signals from said comparing means for reading out response data from the correspondingly numbered memory address, F. a punish control associated with the memory for changing the contents of the correspondingly numbered memory address when the data read into the output register is incorrect, and G. an adjustable threshold control responsive to the output of the comparing means, said threshold control emitting a recognition signal to the memory register and punish control, even through a selected number of corresponding bits of the numbers in said input register and address register do not coincide so that correct response data for a pattern is read into the output register even through the input pattern actually presented to the system for recognition is distorted, said threshold control comprising 1. a threshold gate,
2. an adjusting biasing means, and
3. means for summing the outputs of the comparator gates and the baising means, the summed outputs controlling the threshold gate so that with a selected setting of the basing means, coincidence between a selected number of bits in the two numbers being compared by the comparing means causes the threshold gate to emit a recognition signal.